United States Patent Office 3,549,339
Patented Dec. 22, 1970

3,549,339
COMPOSITE BRAZING COMPOSITIONS OF A COMPOSITE METAL HAVING VARIOUS LAYERS CONTAINING NICKEL
Arthur T. Cape, Monterey, Calif., assignor to Coast Metals, Inc., Little Ferry, N.J., a corporation of Delaware
No Drawing. Continuation-in-part of application Ser. No. 458,474, May 24, 1964. This application July 2, 1968, Ser. No. 741,861
Int. Cl. B23p 3/00
U.S. Cl. 29—194
6 Claims

ABSTRACT OF THE DISCLOSURE

The invention relates to a composite brazing composition consisting of a nickel strip having thereon a coating consisting of nickel, manganese, cobalt and boron, the coated strip being especially adapted for brazing purposes.

---

This application is a continuation-in-part, of my co-pending application, Ser. No. 458,474, filed May 24, 1965.

The invention relates, as indicated, to a composite brazing composition.

It is highly desirable, for a great variety of brazing purposes, to use brazing alloys or compositions, in the form of strip, foil or wire, because of the ease of handling and placing the strip, foil or wire.

However, a great many of such alloys or compositions are not available in the form of strip, foil or wire, because the alloys or compositions, due to their toughness, are extremely difficult to forge or roll into strip or foil, or extrude into wire, even at relatively high temperatures. Other reasons for inability to roll or forge the alloys or compositions into strip or foil, or to extrude them into wire, include (a) the tendency of one or more of the constituents of the alloy or composition to become oxidized or volatilized at a rolling, forging, or extrusion temperature, and (b) the fact that many of the important alloys or compositions used for brazing are inherently brittle.

For these reasons, alloys containing nickel, silicon and boron, with various modifications thereof, in which one or more of the elements chromium, manganese, titanium, cobalt, copper, tungsten, molybdenum and others are employed, may be obtained only in the form of powders.

Brazing alloys or compositions having a manganese base, and containing nickel, cobalt and boron, are difficult to forge or roll into a strip or foil, or extrude into wire, because of their toughness at the high temperatures required for rolling, forging and extrusion, and because of the tendency of the manganese to oxidize or volatilize during heating operations. It is difficult to combine excellent high temperature properties with forgeability or rollability if the melting point is to be satisfactory for normal brazing operations, that is to say, less than 2000° F.

Brazing alloys or compositions having a copper base, but containing substantial amounts of manganese, nickel and/or cobalt, are forged or rolled with difficulty, because of the tendency of the manganese to become oxidized.

Brazing alloys or compositions having a nickel base, and containing manganese, cobalt, boron and/or silicon, and especially those with high nickel contents, but low (1.5% or less) in boron and/or silicon, have relatively high melting points (2000° F. and over) and are useful for brazing, being particularly satisfactory when used in a vacuum, but high temperatures are required for hot working the alloy. At the required hot working temperature, the manganese is oxidized rapidly, and slabs free from defects are difficult to manufacture. Moreover, there is a tendency for oxides to be retained in the strip and foil rolled from such slabs, giving rise to poor brazes.

Suitable boron containing nickel base composite brazing compositions according to the present invention consist of a nickel strip having thereon a coating consisting of nickel, manganese, cobalt and boron, the nickel strip and the coating being of such thickness that the composite consists of from 50 to 85% nickel, 10 to 35% manganese, 3 to 20% cobalt, and up to about 2% boron.

A typical alloy of the foregoing composition consists of about 67% nickel, 25% manganese, 7% cobalt, and 0.5% boron. The melting point of this alloy is about 1975° F., and the brazing temperature is about 2150° F. The presence of boron and/or silicon in this alloy aids in the readiness with which the alloy wets and brazes various base metals.

I have found that such nickel-base alloys can be manufactured at relatively low cost, in the form of a composite, consisting of a nickel strip or foil, and a master alloy which supplies the remainder of the composition of the brazing alloy.

Nickel strip or foil, is available in thicknesses of from 0.00075" and up. The maximum thickness of a strip or foil used for brazing purposes is perhaps 0.010", although, for special purposes, foil of greater thickness may be required. For some brazing purposes, the strip must be as thin as 0.001", while 0.003" appears to be a common size.

In accordance with the invention, the nickel strip is coated with what I term as a "master" alloy, which is melted and sprayed onto the surface of the strip, preferably by means of a plasma arc spray gun. A dense, tenacious, deposit of the master alloy is formed on the strip, the composition of the deposit being such that when it melts, during a brazing operation in which the coated strip is used as a brazing material, the master alloy dissolves the nickel strip or foil, and the composition of the molten mass is that of the desired brazing alloy.

In a specific example of making a brazing composition of the above analysis, that is to say, about 67% nickel, about 7% cobalt, about 0.5% boron, and about 26% manganese, I use a nickel strip, the weight of which constitutes 60% of the weight of the coated strip, and the weight of the master alloy constitutes 40% of the weight of the coated strip, the master alloy consisting of 65% manganese, 17% nickel, 17% cobalt, and 1% boron. The master alloy is preferably in the form of atomized powder, although crushed material of a mesh size of −325 may be used.

The nickel strip or foil is usually sprayed on one side only, but for some applications, it should be sprayed on both sides, but in a quantity such that the combined weight of the master alloy on both sides is 40% of the weight of the coated strip.

Using this same master alloy, but varying the relative percentage by weight of the nickel strip and master alloy, composite brazing alloys may be formed as follows:

| Percent nickel strip | Percent master alloy | Brazing alloy composition, percent |
|---|---|---|
| 50 | 50 | 58.5 Ni, 8.5 Co, 0.5 B, 32.5 Mn |
| 60 | 40 | 66.8 Ni, 6.8 Co, 0.4 B, 26 Mn |
| 70 | 30 | 75.1 Ni, 5.1 Co, 0.3 B, 19.5 Mn |
| 80 | 20 | 83.4 Ni, 3.4 Co, 0.2 B, 13 Mn |

Various powders may be added to the master alloy, to vary or adjust the composition of the master alloy, and the resultant composition of the final brazing material. For example, nickel-boron, cobalt-boron, or manganese-boron, may be added to produce, let us say, a final brazing material containing 1% boron.

The compositions of the master alloy may be changed to meet various requirements. If, for example, a brazing alloy, high in nickel, is required, and is to contain cobalt and manganese, a master alloy, consisting of only cobalt, manganese and boron, is prepared, as for example, 49.0% cobalt, 49% manganese, and 2% boron. Using this as a master alloy, the following grazing materials may be prepared:

| Percent nickel strip | Percent master alloy | Brazing alloy composition, percent |
|---|---|---|
| 60 | 40 | 60 Ni, 19.6 Co, 19.6 Mn, 0.8 B |
| 70 | 30 | 70 Ni, 14.7 Co, 14.7 Mn, 0.6 B |
| 80 | 20 | 80 Ni, 9.8 Co, 9.8 Mn, 0.4 B |

Any number of elements may be incorporated into the master alloy, but in general, the ratio of nickel strip to master alloy by weight should not be less than 1:1, although it may be as high as 4:1. It is not advisable to build up too large a sprayed mass of master alloy on the nickel strip or foil, since the thicker the mass, the greater the tendency of the mass to break away from the strip.

Another example of a brazing composition which may be made by the method, as described, consists of about 70% nickel, 15% manganese, 3.5% chromium, 2.5% copper, 1.5% boron, 2.5% silicon, and 5% iron, the manganese, chromium, copper, boron, silicon and iron, being supplied by the master alloy.

A further example of a brazing alloy or composition which may be made by this method, consists of nickel, manganese, copper and silicon. Using nickel strip, which constitutes 70% by weight of the coated strip, and a coating of a master alloy consisting of 83% manganese, 10% copper, and 7% silicon, to provide the remainder (30% by weight) of the coated strip, a brazing composition or alloy consisting of about 70% nickel, 25% manganese, 3% copper, and 2% silicon is obtained upon melting of the coated strip. This alloy or composition has a relatively high melting point.

Using nickel strip, which constitutes 60% by weight of the coated strip, and a coating of a master alloy consisting of 25% nickel, 62.5% manganese, 7.5% copper, and 5.0% silicon, to provide the remainder (40% by weight) of the coated strip, a brazing alloy or composition consisting of 70% nickel, 25% manganese, 3% copper, and 2% silicon, is obtained upon melting of the coated strip. This composition is identical with that in the preceding paragraph, but the coated strip has a considerably lower melting point than that of the coated strip in the preceding paragraph.

It is thus seen that I have provided a composite strip for brazing purposes, in which only the nickel, or the major portion of the nickel, is supplied in the form of a rolled strip or foil, so that a composite brazing product is provided which has excellent brazing properties, but the overall composition of which is such that if the composition was made up wholly from metal powders, it would be difficult to produce by forging or rolling, for the reasons hereinbefore stated.

It is to be understood that the term "strip" as used herein, is to be construed to cover foil and wire or similar products in elongated form.

Having thus described my invention, I claim:

1. A composite brazing composition consisting of nickel strip having thereon a coating consisting of cobalt, manganese and boron, the nickel strip and coating being of such thickness that the ccomposite consists of from 60 to 80% nickel, 10 to 20% cobalt, 10 to 20% manganese, and up to 2% boron.

2. A composite brazing composition consisting of a nickel strip having a coating of a master alloy adhered thereto, the nickel strip constituting 70% of the weight of the combined weight of the strip and master alloy, and the master alloy constituting 30% of the weight of such combined weight, the master alloy consisting of manganese, chromium, copper, boron, silicon and iron, in relative amounts such that the composite consists of 15% manganese, 3.5% chromium, 2.5% copper, 1.5% boron 2.5% silicon, 5% iron, and the balance nickel.

3. A composite brazing composition consisting of a nickel strip having a coating of a master alloy adhered thereto, the nickel strip constituting 70% of the weight of the coated strip, and the master alloy constituting 30% of the weight of the coated strip, the master alloy consisting of manganese, copper and silicon, in relative amounts such that the composite consists of 70% nickel, 25% manganese, 3% copper, and 2% silicon.

4. A composite brazing composition consisting of a nickel strip having a coating of a master alloy adhered thereto, the nickel strip constituting 60% of the weight of the coated strip, and the master alloy constituting 40% of the weight of the coated strip, the master alloy consisting of nickel, manganese, copper and silicon, in relative amounts such that the composite consists of 70% nickel, 25% manganese, 3% copper, and 2% silicon.

5. A composite brazing composition consisting of nickel strip having thereon a coating consisting of nickel, manganese, cobalt and boron, the nickel strip and coating being of such thickness that the composite consists of from about 58.5 to about 83.4% nickel, from about 3.4 to about 8.5% cobalt, from about 13 to about 32.5% manganese, and from about 0.2 to about 0.5% boron, in which the nickel strip constitutes at least 50% of the weight of the composite brazing composition.

6. A composite brazing composition consisting of a nickel strip having a coating of a master alloy adhered thereto, the nickel strip constituting 60% by weight of the coated strip, and the master alloy constituting 40% of the weight of the coated strip, the master alloy consisting of manganese, nickel, cobalt and boron, in relative amounts such that the composite consists of about 67% nickel, about 7% cobalt, about 26% manganese, and about 0.5% boron.

References Cited

UNITED STATES PATENTS

| | | | |
|---|---|---|---|
| 2,753,623 | 7/1956 | Boessenkool | 29—194 |
| 2,878,410 | 3/1959 | Millis | 29—196.6 |

FOREIGN PATENTS

| | | | |
|---|---|---|---|
| 302,394 | 12/1928 | Great Britain. | |
| 302,394 | 12/1928 | Great Britain | 75—170J |

HYLAND BIZOT, Primary Examiner